(12) United States Patent
Van Der Maat et al.

(10) Patent No.: US 7,445,384 B2
(45) Date of Patent: Nov. 4, 2008

(54) PYROMETER

(75) Inventors: Paul Van Der Maat, Gand (BE); Eric Hanse, Feignies (FR)

(73) Assignee: Vesuvius Crucible Company, Wilmington, DE (US)

( * ) Notice: Subject to any disclaimer, the term of this patent is extended or adjusted under 35 U.S.C. 154(b) by 597 days.

(21) Appl. No.: 10/490,138

(22) PCT Filed: Sep. 26, 2002

(86) PCT No.: PCT/BE02/00148

§ 371 (c)(1),
(2), (4) Date: Mar. 18, 2004

(87) PCT Pub. No.: WO03/029771

PCT Pub. Date: Apr. 10, 2003

(65) Prior Publication Data

US 2005/0157773 A1    Jul. 21, 2005

(51) Int. Cl.
  *G01K 1/14* (2006.01)
  *G01K 1/16* (2006.01)
  *G01J 5/02* (2006.01)
(52) U.S. Cl. .................. 374/139; 374/208; 374/120; 266/265; 356/43
(58) Field of Classification Search .......... 374/139, 374/140, 208, 120, 121; 266/274, 47, 265; 73/DIG. 9; 356/43
See application file for complete search history.

(56) References Cited

U.S. PATENT DOCUMENTS

| | | | | |
|---|---|---|---|---|
| 2,971,041 A * | 2/1961 | France | .................. | 136/234 |
| 3,452,598 A * | 7/1969 | Jones, Jr. | ............... | 374/126 |
| 3,468,695 A * | 9/1969 | Federman | ................ | 427/320 |
| 3,498,133 A * | 3/1970 | Hiratsuka et al. | ........... | 374/196 |
| 4,459,043 A * | 7/1984 | Luke | ..................... | 374/130 |
| 4,569,228 A * | 2/1986 | Bellgardt et al. | ........... | 73/866.5 |
| 4,721,533 A * | 1/1988 | Phillippi et al. | ............. | 136/234 |
| 4,737,038 A * | 4/1988 | Dostoomian | ............... | 374/139 |
| 4,749,416 A * | 6/1988 | Greenspan | ................ | 136/232 |
| 4,866,410 A * | 9/1989 | Deppe et al. | ............... | 338/28 |
| 4,977,001 A * | 12/1990 | Greenspan | ............... | 428/34.6 |
| 5,180,228 A | 1/1993 | Tarumi et al. | | |
| 5,181,779 A * | 1/1993 | Shia et al. | ................... | 374/139 |

(Continued)

FOREIGN PATENT DOCUMENTS

JP        07243914  A  *  9/1995

(Continued)

*Primary Examiner*—Gail Verbitsky
(74) *Attorney, Agent, or Firm*—James R. Williams

(57) ABSTRACT

The invention provides an apparatus for measuring the temperature of a molten bath comprising a) a refractory mounting sleeve (1,1') having an outer surface (2) for contacting the molten bath and an inner cavity (3), said inner cavity having an inner surface (4), an outer opening (6) and an inner closed end (5); and b) an optical pyrometer (7) attached to the mounting sleeve and adapted to measure the thermal radiation emitted by a measurement zone (10) located inside the inner cavity of the mounting sleeve and under the molten bath level. The inner cavity outer opening (6) is adapted to receive fixedly the optical pyrometer (7). The apparatus is characterized in that the mounting plate (8) is adapted to engage in a complementary recess located at the inner cavity outer opening (6) of the mounting sleeve (1,1'). Thereby, the accuracy and reproducibility of the measure is greatly increased.

11 Claims, 1 Drawing Sheet

U.S. PATENT DOCUMENTS

| | | | |
|---|---|---|---|
| 5,302,027 A | | 4/1994 | Park |
| 5,366,290 A | * | 11/1994 | Mayer et al. ................. 374/130 |
| 5,447,373 A | * | 9/1995 | Okuhara ...................... 374/131 |
| 5,474,618 A | * | 12/1995 | Allaire ........................ 136/234 |
| 5,632,557 A | * | 5/1997 | Simons ....................... 374/148 |
| 5,839,830 A | * | 11/1998 | Young et al. ................. 374/161 |
| 5,870,511 A | * | 2/1999 | Sawatari et al. ............... 385/12 |
| 5,917,145 A | * | 6/1999 | Parent et al. ................. 136/234 |
| 5,949,000 A | * | 9/1999 | Lindholm et al. ........ 73/864.91 |
| 6,422,745 B1 | * | 7/2002 | Glasheen et al. ............ 374/131 |
| 6,485,175 B1 | * | 11/2002 | Nimberger et al. .......... 374/142 |
| 6,536,950 B1 | * | 3/2003 | Green et al. ................. 374/179 |
| 6,733,173 B1 | * | 5/2004 | Huston et al. ................ 374/121 |
| 6,772,085 B2 | * | 8/2004 | Watkins et al. .............. 702/130 |
| 6,846,105 B2 | * | 1/2005 | Xie et al. ..................... 374/139 |
| 2002/0085617 A1 | * | 7/2002 | Gul ............................ 374/208 |

FOREIGN PATENT DOCUMENTS

JP    11248541    9/1999

* cited by examiner

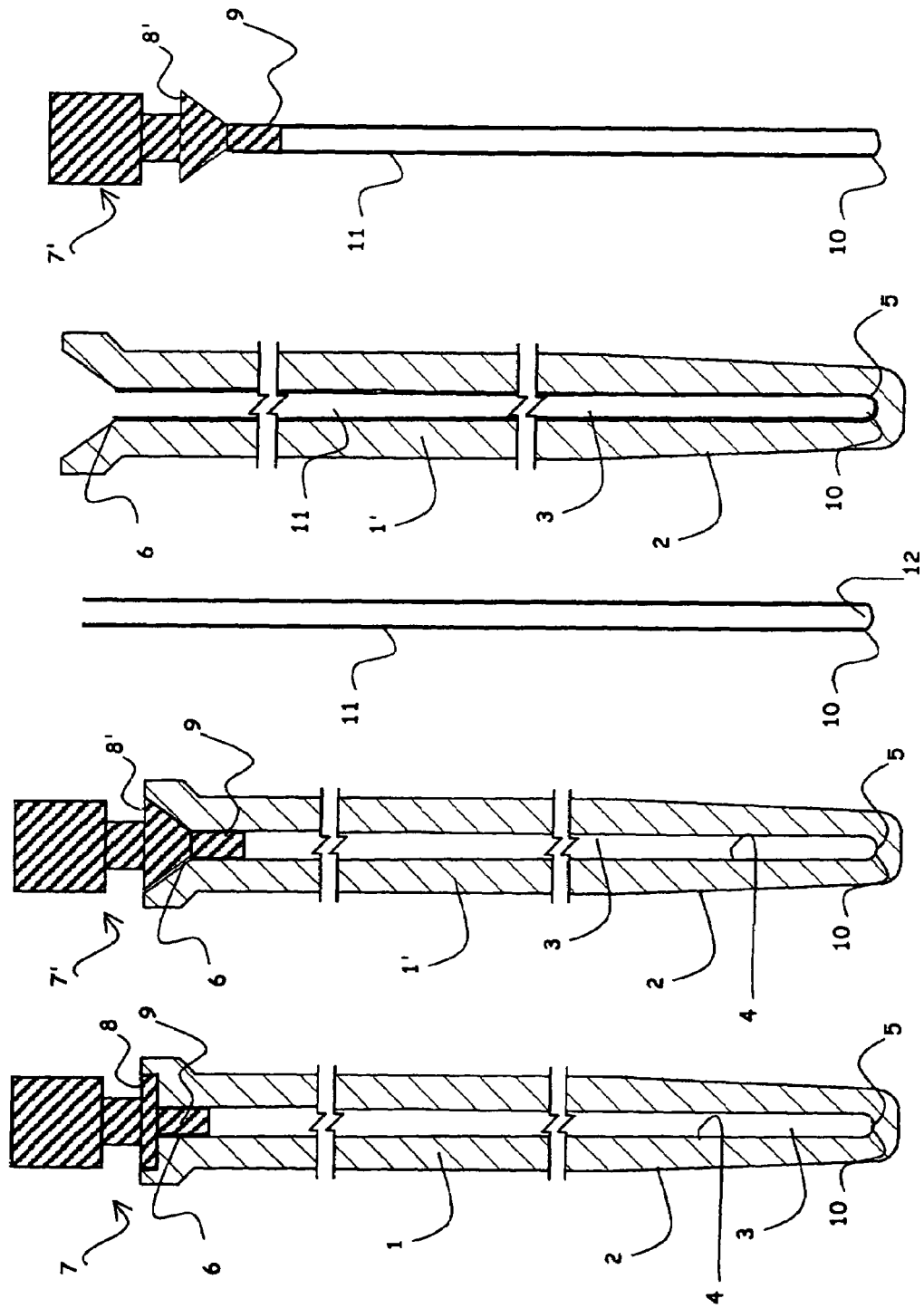

PYROMETER

FIELD OF THE INVENTION

The present invention relates to an apparatus for measuring the temperature of a molten bath, to a refractory mounting sleeve for use in such an apparatus and to a particular assembly of an optical pyrometer with a refractory tube.

BACKGROUND OF THE INVENTION

A molten bath, for example a molten metal bath can have a temperature of up to 1800° C. or higher, and often needs to be monitored closely and accurately in order for many reactions or operations in the molten bath to be properly controlled. Normally, such an environment is destructive for thermocouples or other monitoring type-devices.

Radiation pyrometry, more commonly called optical pyrometry, measures the temperature of a substance by measuring the thermal radiation emitted by the substance. Thermal radiation is a universal property of matter that is present at any temperature above absolute zero. For optical pyrometry, the useful part of the thermal radiation emitted by most substances is continuous over a spectral range of approximately 0.3 to 20 µm. This spectral range encompasses the ultraviolet (UV) radiation, up to 0.38 µm; the visible (VIS) range, from 0.38 to 0.78 µm; and the infrared (IR) radiation, from 0.78 to 20 µm. IR radiation is further divided into three segments, near IR (0.78 to 3 µm), middle IR (3 to 6 µm) and far IR (above 6 µm). The distribution of the thermal radiation of a substance over the spectral range is a function of both the temperature and emissivity of the substance. Higher temperatures shift the distribution toward the shorter wavelengths. Higher emissivity increases the thermal radiation at a given temperature, whereas lower emissivity reduces the thermal radiation at the same temperature. Optical pyrometry utilises the radiating and propagating properties of matter to ascertain the temperature of a substance by measuring the intensity of the thermally radiated UV, VIS or IR energy of the substance.

In a known method, an optical monitoring device (optical pyrometer) is placed above the molten bath to measure the bath temperature. However, the temperature can be difficult to measure because an insulating slag layer is generally present over the molten bath and acts as a shield for the optical monitoring device. Further, dust can be generated in the space above the slag layer and can partially block the optical measuring device, thereby providing an inaccurate measurement of the temperature of the bath.

U.S. Pat. No. 5,302,027 discloses an apparatus for measuring the temperature of a molten bath which eliminates part of the problems discussed above. This apparatus comprises: a) a refractory mounting sleeve having an outer surface for contacting the molten bath and an inner cavity, said inner cavity having an inner surface, an outer opening and an inner closed end; and b) an optical pyrometer located on the top of the mounting sleeve and adapted to measure the thermal radiation emitted by a measurement zone located inside the inner cavity of the mounting sleeve and under the molten bath level. This apparatus is partially immersed in a molten bath. The principle of the measurement method using this apparatus is based on the fact that the thermal radiation emitted by the refractory material used as mounting sleeve is linked to the temperature of the molten bath. The refractory mounting sleeve acts as a shield that thermally protects the optical pyrometer, but also allows the measures to be made in a measurement zone located under the insulating slag layer, deep into the molten bath level.

Applicant has observed that the temperatures measured with such an apparatus were less than accurate. Therefore, a need still exists for a new apparatus for accurately and closely measuring the temperature of a molten bath.

Applicant has also established that in use, the apparatus is subject to such vibrations and shocks that the zone where the measure is read (i.e. the target or measurement zone) by the optical pyrometer moves inside the inner cavity so that accurate and reliable measures cannot be performed. Having recognised the problem, applicant has designed a new refractory sleeve adapted to receive fixedly the optical pyrometer so that this problem is overcome.

SUMMARY OF THE INVENTION

According to the invention, this objective is reached with an apparatus for measuring the temperature of a molten bath comprising
  a) a refractory mounting sleeve having an outer surface for contacting the molten bath and an inner cavity, said inner cavity having an inner surface, an outer opening and an inner closed end; and
  b) an optical pyrometer attached to the mounting sleeve and adapted to measure the thermal radiation emitted by a measurement zone located inside the inner cavity of the mounting sleeve and under the molten bath level, characterised in that the inner cavity outer opening is adapted to receive fixedly the optical pyrometer.

The mounting sleeve and the optical pyrometer must have co-operating means to prevent relative movement of the pyrometer during its use so that the measurement zone is substantially always located in the same zone in the inner cavity and, consequently, the measure is more reliable.

Therefore, according to the invention, the co-operating means preventing the relative movement of the pyrometer during its use comprise a mounting plate of the optical pyrometer adapted to engage in a complementary recess located at the inner cavity outer opening of the mounting sleeve.

The invention also relates to a refractory mounting sleeve for use in an apparatus for measuring the temperature of a molten bath, having an outer surface for contacting the molten bath and an inner cavity, said inner cavity having an inner surface, an outer opening and an inner closed end located under the molten bath level, the inner cavity outer opening being adapted to receive fixedly an optical pyrometer. According to the invention, the refractory mounting sleeve comprises a recess located at the outer opening of the inner cavity adapted to receive fixedly the optical pyrometer so that all relative movements thereof are eliminated. Consequently, the refractory mounting sleeve solves the above problem which was due to vibrations and shocks causing the measurement zone of the optical pyrometer to move inside the inner cavity so that accurate and reliable measures could not be performed.

According to a particularly preferred variant of the invention, the recess is frustoconical.

According to another embodiment of the invention, the inner cavity is straight so that, should the measurement zone move, the risk of having the said measurement zone located, for example on a shoulder in the inner cavity is eliminated. It is of course to be understood that this straightness feature does not apply to the inner cavity outer opening zone which, as indicated above, can be recessed.

Advantageously, the inner closed end of the inner cavity is substantially comprised in a plane perpendicular to a longitudinal axis of the mounting sleeve. In such a case, the inner closed end can provide a measurement zone which is substantially homogeneous, and, consequently, the temperature measurement is extremely accurate and reliable.

According to a variant of the last embodiment, the inner closed end is substantially spherical. The curvature of the inner closed end is preferably calculated so that the distance between the measurement zone and the optical pyrometer remains substantially constant, even in case of minute displacement of the optical pyrometer.

The applicant has also observed that another source of inaccuracy in the measurement can be due to the emission of fumes or other volatile compounds by the refractory material when brought to the temperature of use. These fumes or other volatile compounds can condense on the optical pyrometer (generally on the sighting tube), blocking thereby, fully or partially the measuring ability. In certain cases, the emission of fume or other volatile compounds also led to serious damages of the optical pyrometer. Therefore, according to a preferred embodiment, the refractory mounting sleeve is designed to avoid or limit the emission of fumes or other volatile compounds.

Conventional refractory materials used for the manufacture of protective sleeves for temperature-measuring devices are generally copressed and comprised of 45 to 70 weight % of alumina and 55 to 30 weight % of carbon. The shaped material is then fired at a temperature comprised between 800 and 1100° C. This material shows excellent thermal-shock, chemical and corrosion-resistance.

Although commonly used for conventional pyrometry, in use, this material produces important fumes or other volatile compounds emission and cannot be reliably used in optical pyrometry.

According to a particular aspect of the invention, the material constituting the mounting sleeve is fired at a temperature above 1200° C. and preferably around the temperature of use of the material, reducing thereby dramatically the fumes or other volatile compounds emission while keeping the excellent resistance of the material.

According to a preferred variant, the refractory mounting sleeve comprises a refractory tube incorporated into the inner cavity. The refractory tube is preferably at least partly comprised of a material which completely eliminates the fume or other volatile compounds emission problems. Preferably, the material is gas-tight so that the ingress of volatile compounds or others fumes through the walls of the tubes are avoided. Suitable materials comprise alumina based materials such as corundum or mullite (for example the ZYALOX™ tubes from the company VESUVIUS Mc DANNEL), zirconia (for example the ZYAZIRC™ tubes from the company VESUVIUS Mc DANNEL), pure graphite, silica, molybdenum and the like. Preferably, the tube walls are thin enough, for example between 0.5 and 5 mm, to avoid increasing the response-time of the temperature-measurement. It is also advantageous that the tube fits closely the inner cavity of the mounting sleeve to avoid the formation of an insulating layer between the outer surface of the tube and the inner surface of the mounting sleeve. In a variant, a heat-conducting cement can be used to secure the tube in the inner cavity.

The refractory tube can be inserted or copressed with the mounting sleeve. The insertion of the tube is preferred as it permits re-using the tube.

According to yet another of its aspect, the invention relates to an assembly of a tube and an optical pyrometer, the optical pyrometer being set to measure the thermal radiation emitted by a measurement zone located inside the tube and the tube being adapted to be inserted into an inner cavity of a refractory mounting sleeve. Such an assembly is extremely advantageous since, beside the problem of low reliability due to the problem of gas or fumes emission, the assembly, which can be pre-mounted and only needs to be inserted into the refractory mounting sleeve, reduces tremendously the on-site necessary hand-work. Further, the assembly can be easily reused when the refractory mounting sleeve is worn.

Preferably, the assembly comprises means allowing the control of the atmosphere inside the tube. For example, the tube or the optical pyrometer may have a gas exhaust outlet allowing to remove, reduce or replace the atmosphere comprised inside the tube.

Advantageously, at least in the measurement zone, a material with a high emissivity at the temperature of use is present (such as very pure graphite) increasing thereby the accuracy of the temperature measurement. This material can be present as a pastille at the inner closed end of the inner cavity or of the tube.

To facilitate a better understanding of the invention, it will now be described with reference to the figures illustrating particular embodiments of the invention, without however limiting the invention in any way.

BRIEF DESCRIPTION OF THE DRAWINGS

In these figures,

FIG. 1 shows a schematic view of an apparatus for measuring the temperature of a molten bath comprising a mounting refractory sleeve according to a first embodiment of the invention;

FIG. 2 shows a schematic view of an apparatus for measuring the temperature of a molten bath comprising a mounting refractory sleeve according to a second embodiment of the invention;

FIG. 3 shows a schematic view of a tube which can be inserted in the mounting sleeve such as the one depicted at FIG. 2;

FIG. 4 shows a schematic view of a mounting sleeve with a tube inserted therein

FIG. 5 shows an assembly of an optical pyrometer and a tube.

DETAILED DESCRIPTION OF THE INVENTION

Visible on FIGS. 1, 2 and 4 are the refractory mounting sleeves 1,1' having an outer surface 2 adapted to contact a molten bath, for example a molten metal bath and an inner cavity 3. The inner cavity 3 has an inner surface 4, a closed inner end 5 and an outer opening 6. The outer opening 6 is adapted to receive fixedly an optical pyrometer 7. The optical pyrometer is schematically depicted at FIGS. 1 and 2. It comprises a mounting plate 8 designed to engage into a corresponding recess present at the outer opening 6 of the inner cavity 3 and a sighting tube 9 engaged into the inner cavity 3. The pyrometer 7 can be connected to a processor through wires or cables (not shown).

In the embodiment shown on FIGS. 1 and 2, the measurement zone 10 substantially coincides with the inner closed end 5 of the mounting sleeve. The straightness of the inner cavity 3 prevents inaccuracy of the measure which could be due to misalignment of the sighting tube 9.

In the embodiment depicted at FIG. 4, a tube 11 made from an alumina based material is inserted into the refractory mounting sleeve 1'. The material constituting the tube does not contain volatile materials, so that the emission of fumes is prevented and the time-life of the sighting tube is largely extended.

The tube 11 depicted at FIG. 3 can also be inserted into a mounting sleeve. It comprises in the measurement zone 10, a pastille 12 of a material selected for its excellent emissivity properties, for example ultra-pure graphite.

FIG. 5 shows an assembly of an optical pyrometer 7' and a tube 11. The assembly can be easily and quickly inserted into a refractory mounting sleeve 1' (not visible on FIG. 5) so that on-site handwork is reduced. In the embodiment shown, the sighting tube 9 of the optical pyrometer is engaged into the tube 11. A gas-tight connection can be obtained with conventional sealant (not shown). The optical pyrometer 7' is set to measure the temperature in the measurement zone 10. Advantageously, the optical pyrometer 7' comprises a mounting plate 8' adapted to engage into a corresponding recess located at the outer opening 6 of the refractory mounting sleeve 1'.

REFERENCES

1. Refractory mounting sleeve
2. Outer surface
3. Inner cavity
4. Inner surface
5. Inner closed end
6. Outer opening
7. Pyrometer
8. Mounting plate
9. Sighting tube
10. Measurement zone
11. Tube
12. Pastille

The invention claimed is:

1. Apparatus for measuring the temperature of a molten bath, the molten bath having a top surface, the apparatus comprising:
    a) a refractory mounting sleeve having an inner surface defining an inner cavity and a measurement zone located under the top surface of the molten bath, and an outer surface including a closed end and defining an opening located above the top surface of the molten bath, the opening including a recess; and
    b) an optical pyrometer comprising a mounting plate that complementarily and fixedly engages the recess of the opening, so as to align the pyrometer with the mounting sleeve, the pyrometer capable of measuring thermal radiation emitted by the measurement zone.

2. Apparatus of claim 1, wherein the recess is frustoconical.

3. Apparatus of claim 1, wherein the inner cavity is substantially straight.

4. Apparatus of claim 1, wherein the refractory sleeve comprises a material with reduced emission of volatile compounds at use temperatures.

5. Apparatus of claim 1, wherein the inner surface comprises a refractory tube.

6. Apparatus of claim 5, wherein the tube has a wall thickness from 0.5 to 5 mm.

7. Apparatus of claim 5, wherein the tube comprises a material with reduced emission of volatile compounds at use temperatures.

8. Apparatus of claim 5, wherein the tube includes alumina.

9. Apparatus of claim 1, wherein at least a part of the measurement zone has an emissivity higher than or equal to the emissivity of carbon.

10. Apparatus for measuring the temperature of a molten bath, the molten bath having a top surface, the apparatus comprising:
    a) a refractory tube including an inner surface with a measurement zone located under the top surface of the molten bath, and an outer surface including a closed end and defining an opening located above the top surface of the molten bath, the opening including a recess;
    b) refractory mounting sleeve substantially surrounding the outer surface of the tube; and
    c) an optical pyrometer comprising a mounting plate that complementarily and fixedly engages the recess of the opening, so as to align the pyrometer with the mounting sleeve, the pyrometer capable of measuring thermal radiation emitted by the measurement zone.

11. Apparatus for measuring the temperature of a molten bath, the molten bath having a top surface, the apparatus comprising:
    a) a refractory mounting sleeve having an inner surface defining an inner cavity and a measurement zone located under the top surface of the molten bath, and an outer surface including a closed end and defining an opening located above the top surface of the molten bath, the opening including an unthreaded recess; and
    b) an optical pyrometer comprising a mounting plate that complementarily and fixedly engages the recess of the opening, so as to align the pyrometer with the mounting sleeve, the pyrometer capable of measuring thermal radiation emitted by the measurement zone.

* * * * *